(12) United States Patent
Kim et al.

(10) Patent No.: US 10,597,815 B2
(45) Date of Patent: Mar. 24, 2020

(54) LAUNDRY TREATMENT APPARATUS

(71) Applicant: LG ELECTRONICS INC., Seoul (KR)

(72) Inventors: Hyewon Kim, Seoul (KR); Junghwan Lee, Seoul (KR); Taewoo Yoo, Seoul (KR); Kyungah Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 15/988,270

(22) Filed: May 24, 2018

(65) Prior Publication Data
US 2018/0340290 A1    Nov. 29, 2018

(30) Foreign Application Priority Data

May 24, 2017    (KR) .................. 10-2017-0064248

(51) Int. Cl.
*F26B 3/00*    (2006.01)
*D06F 58/24*   (2006.01)
(Continued)

(52) U.S. Cl.
CPC .............. *D06F 58/24* (2013.01); *A47B 35/00* (2013.01); *D06F 75/08* (2013.01); *D06F 81/06* (2013.01)

(58) Field of Classification Search
CPC .......... D06F 58/00; D06F 58/10; D06F 58/14; D06F 58/24; D06F 58/20; D06F 58/203;
(Continued)

(56) References Cited

U.S. PATENT DOCUMENTS 1,814,698 A    7/1931  Huber
3,026,699 A    3/1962  Rhodes
(Continued)

FOREIGN PATENT DOCUMENTS

KR    10-0220751    9/1999
KR    10-0826205    4/2008
(Continued)

OTHER PUBLICATIONS

Korean Search Report dated Oct. 2, 2018 issued in Application No. PCT/KR2018/005893.
(Continued)

*Primary Examiner* — John P McCormack
(74) *Attorney, Agent, or Firm* — Ked & Associates, LLP

(57) ABSTRACT

A laundry treatment apparatus dries laundry by sending air to the laundry while the laundry is hung on a hanger, and dehumidifies surrounding air of the laundry to reduce a drying time of the laundry. The laundry treatment apparatus of the present disclosure includes: a cabinet which has an air inlet; a dehumidifying unit which is provided inside the cabinet, and dehumidifies air suctioned into the cabinet through the air inlet; a first blower unit which is provided at a top portion of the cabinet, and discharges the air dehumidified in the cabinet by the dehumidifying unit; and a second blower unit which is provided over the cabinet with a distance therebetween, has a hanging part on which a hanger is hung, and suctions air to send the air to the laundry hung on the hanger.

13 Claims, 6 Drawing Sheets

(51) Int. Cl.
*A47B 35/00* (2006.01)
*D06F 75/08* (2006.01)
*D06F 81/06* (2006.01)

(58) Field of Classification Search
CPC ........ D06F 58/28; D06F 58/206; D06F 75/08;
D06F 81/06; D06F 81/00; F26B 9/00;
F26B 9/10; A47B 35/00; F24F 2221/18
USPC ..................................... 34/508–510, 443, 72
See application file for complete search history.

(56) References Cited

U.S. PATENT DOCUMENTS

| | | | |
|---|---|---|---|
| 3,031,871 A | 5/1962 | Bailey | |
| 3,209,560 A | 10/1965 | Shelton | |
| 3,331,226 A | 7/1967 | Fink | |
| 5,253,493 A | 10/1993 | Ohashi | |
| 6,889,449 B2 * | 5/2005 | Silver | F26B 9/06 34/389 |
| 7,814,770 B2 * | 10/2010 | Jeon | D06F 25/00 68/13 R |
| 7,861,436 B2 * | 1/2011 | Kim | D06F 58/10 34/202 |
| 2004/0168481 A1 | 9/2004 | Usherovich et al. | |
| 2005/0056059 A1 | 3/2005 | Usherovich et al. | |
| 2009/0139276 A1 | 6/2009 | Kim et al. | |
| 2009/0235697 A1 | 9/2009 | Reid et al. | |
| 2009/0255300 A1 | 10/2009 | Doyle et al. | |
| 2009/0313864 A1 | 12/2009 | Achterberg et al. | |
| 2010/0294004 A1 | 11/2010 | Hu | |
| 2012/0285037 A1 | 11/2012 | Park et al. | |
| 2014/0292101 A1 | 10/2014 | Baarman et al. | |
| 2015/0159315 A1 | 6/2015 | Lim et al. | |
| 2015/0247274 A1 | 9/2015 | Kim et al. | |
| 2015/0252508 A1 | 9/2015 | Kim et al. | |
| 2016/0102425 A1 | 4/2016 | Scheckelhoff | |
| 2017/0037557 A1 | 2/2017 | Doyle et al. | |

FOREIGN PATENT DOCUMENTS

| | | |
|---|---|---|
| KR | 10-2011-0067888 | 6/2011 |
| KR | 10-2011-0084006 | 7/2011 |
| KR | 10-2013-0022661 | 3/2013 |
| KR | 10-1467752 | 12/2014 |
| KR | 10-2015-0065297 | 6/2015 |
| KR | 10-2015-0092073 | 8/2015 |
| KR | 10-2015-0100498 | 9/2015 |
| KR | 10-2016-0089669 | 7/2016 |

OTHER PUBLICATIONS

International Search Report dated Sep. 27, 2018 issued in International Application No. PCT/KR2018/005903.
International Search Report dated Sep. 28, 2018 issued in International Application No. PCT/KR2018/005899.
United States Office Action dated Jan. 9, 2020 issued in U.S. Appl. No. 15/988,173.
United States Office Action dated Feb. 6, 2020 issued in U.S. Appl. No. 15/988,518.

* cited by examiner

LAUNDRY TREATMENT APPARATUS

CROSS-REFERENCE TO RELATED APPLICATION

This application claims priority under 35 U.S.C. § 119 to Korean Application No. 10-2017-0064248, filed on May 24, 2017, whose entire disclosure is hereby incorporated by reference.

BACKGROUND

1. Field

The present disclosure relates to a laundry treatment apparatus, and more particularly, to a laundry treatment apparatus to dry and iron laundry.

2. Background

Washing machines, which generally perform sequential washing, rinsing, and spin-drying operations, are examples of laundry treatment apparatus. The washing machine may be generally classified into a top-loading washing machine or a front-loading washing machine (also called a drum washing machine). The top-loading washing machine performs washing of laundry by using a rotating water stream generated in wash water. In contrast, the front-loading washing machine may perform washing of laundry by friction between laundry items that is generated when the laundry items are lifted and dropped by a lifter installed at an inner circumference of a drum.

After washing of laundry by the washing machine, the laundry may be dried and/or ironed. Laundry drying machines have been developed and may be provided separately from the washing machine. The drying machine may have an external appearance similar to the washing machine. One example of the drying machine is a mechanical dryer in which the laundry is dried inside the drying machine using heated air.

The laundry may be hung to be air dried using evaporation of water and without using the mechanical dryer. Water vapor generated in the course of air drying the laundry may makes indoor air too humid, such that a drying time of the laundry may become undesirably long and mold may develop on the laundry. Also, the laundry may be wrinkled after air drying, and a user employ a separately provided iron and ironing board to iron the laundry.

BRIEF DESCRIPTION OF THE DRAWINGS

The embodiments will be described in detail with reference to the following drawings in which like reference numerals refer to like elements, and wherein.

DETAILED DESCRIPTION

Figure 1:
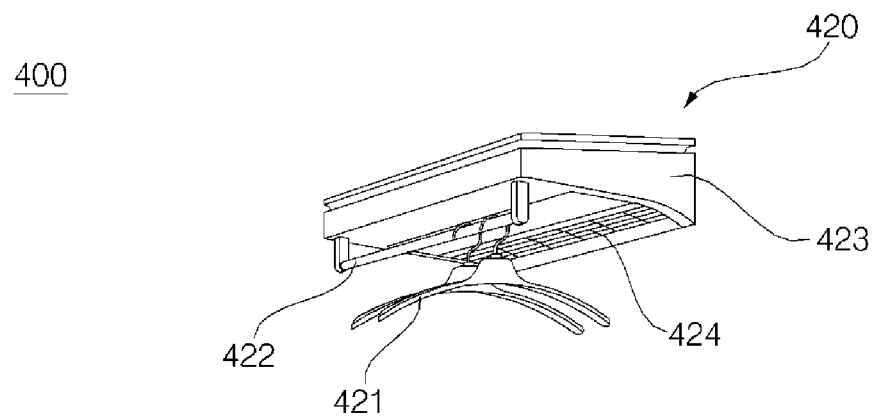
FIG. 1 is a perspective view illustrating an operation state of a laundry treatment apparatus according to an embodiment of the present disclosure.
Figure 1:
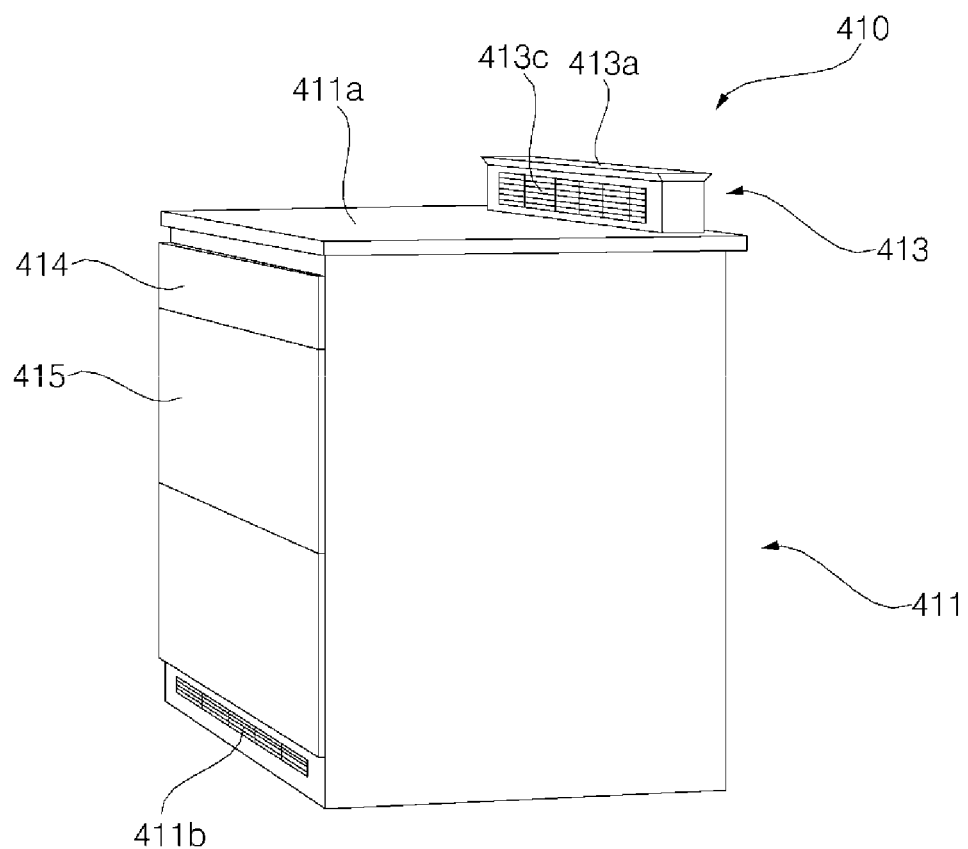
Figure 2:
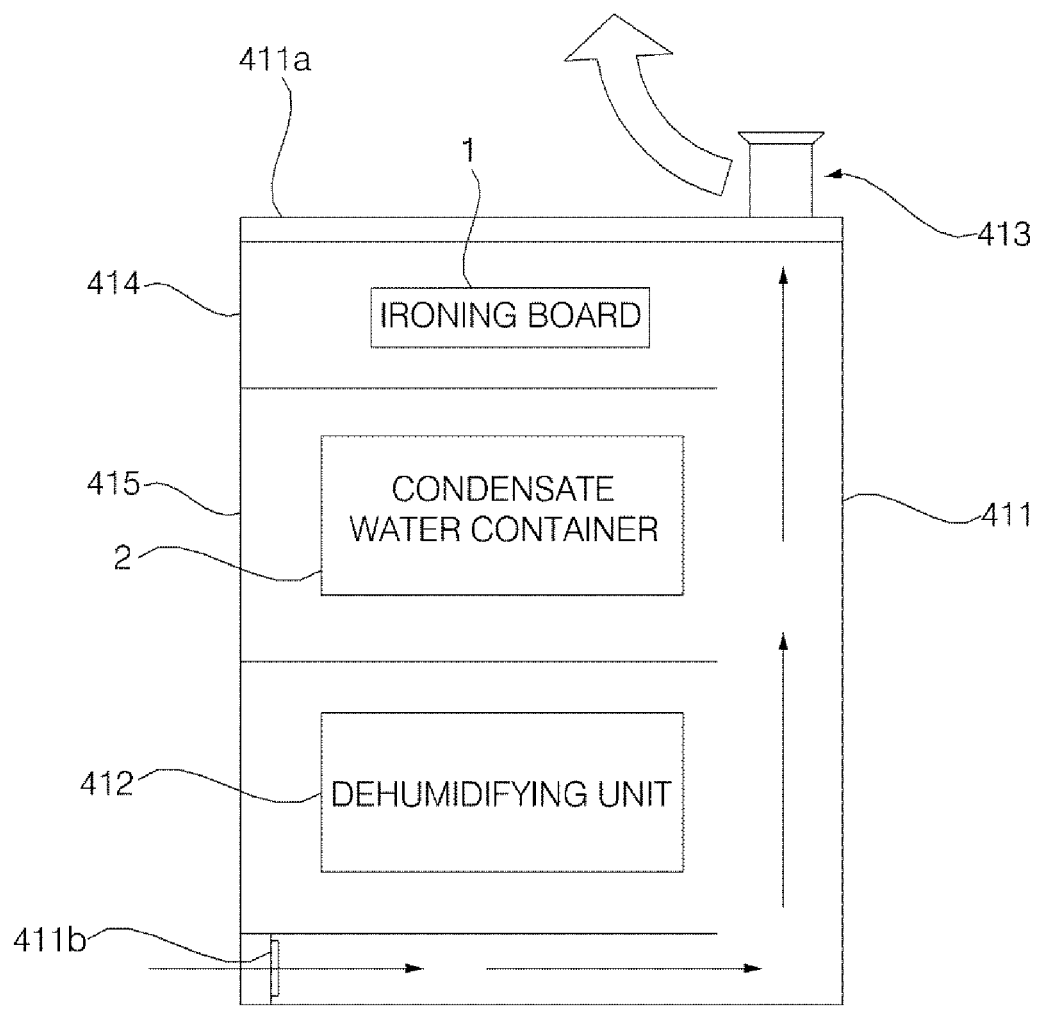
FIG. 2 is a side cross-sectional view illustrating a dehumidifying and ironing module illustrated in FIG. 1.
Figure 3:
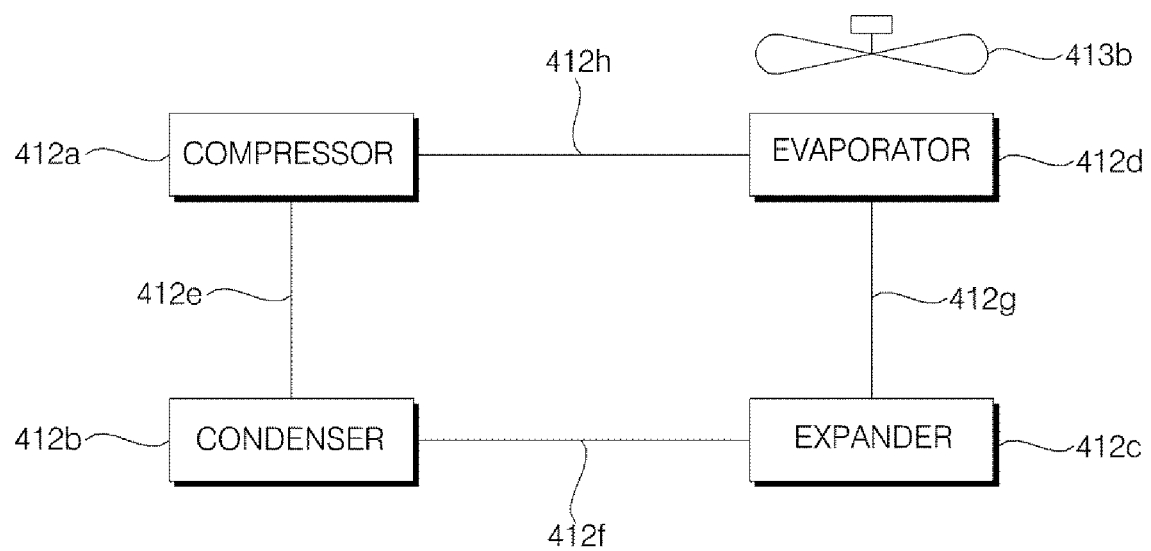
FIG. 3 is a view illustrating a dehumidifying unit illustrated in FIG. 2.
Figure 4:
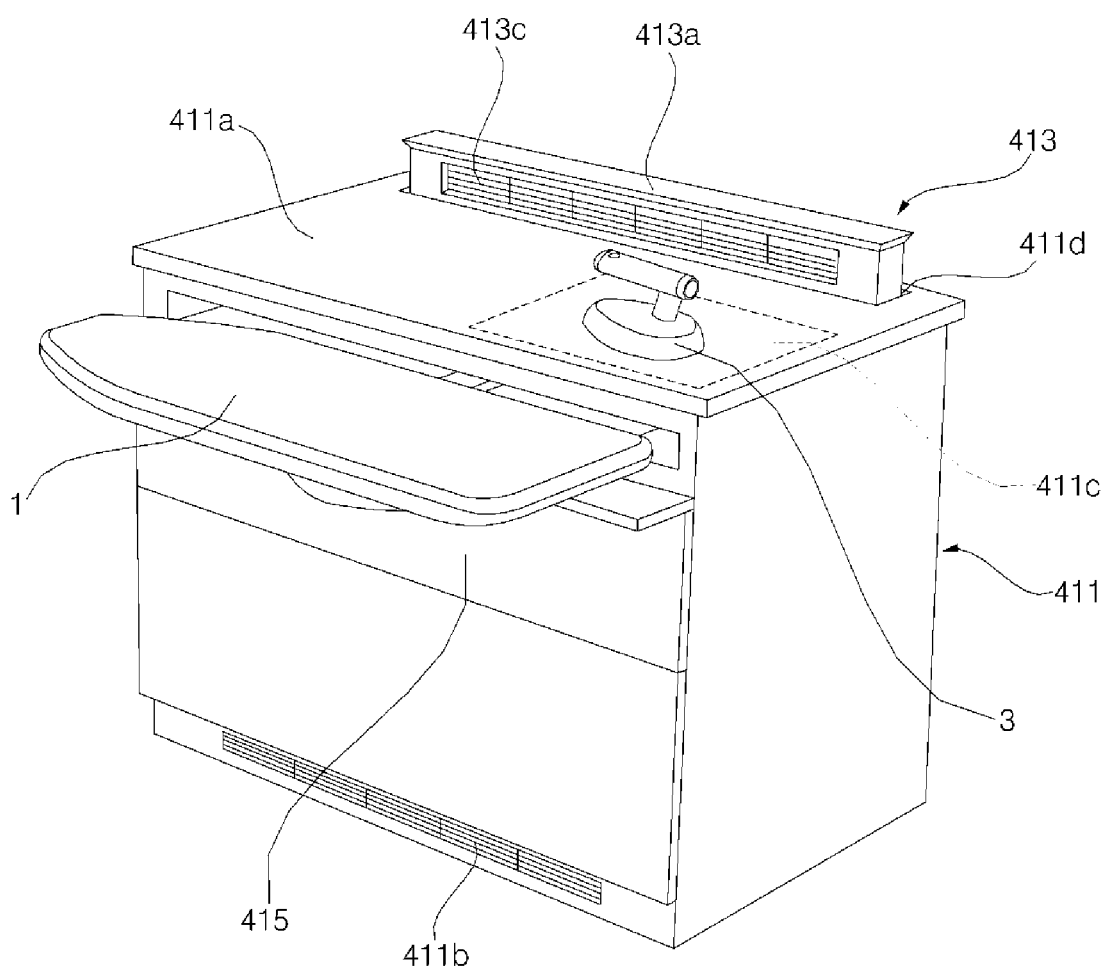
FIG. 4 is a view illustrating a first storage space which is opened in the dehumidifying and ironing module illustrated in FIG. 1.

Hereinafter, a laundry treatment apparatus according to embodiments of the present disclosure will be described with reference to accompanying drawings.

Referring to FIGS. 1 to 6, a laundry treatment apparatus 400 may include a dehumidifying and ironing module 410 and a drying module 420. The dehumidifying and ironing module 410 may be installed on an indoor floor surface, and the drying module 420 may be installed on the indoor wall or the ceiling. In another example, the dehumidifying and ironing module 410 and the drying module 420 may be connected via a vertical panel or frame to form an integrated unit. Even if physically separated, a single controller may be connected to both the dehumidifying and ironing module 410 and the drying module 420 and may regulate and coordinate the operation of both the dehumidifying and ironing module 410 and the drying module 420.

The dehumidifying and ironing module 410 may suction and dehumidify indoor air, and may discharge the dehumidified air. Further, the dehumidifying and ironing module 410 may provide a horizontal surface to iron laundry.

The drying module 420 may include a hanging part (or hanger holder) 422, on which a hanger 421 is hung, and may suction indoor air and output the suctioned air toward laundry hung on the hanger 421. The laundry hung on the hanger 421 may be dried by the air flow sent by the drying module 420. As shown in the drawings, the hanging part 422 may include a horizontal bar to receive a hook included in the hanger 421. In another example, the hanging part 422 may include a hook, rack, clasp, ring, or other structure to engage the hanger.

The dehumidifying and ironing module 410 may include a cabinet 411, a dehumidifying unit (or dehumidifier) 412 installed at the cabinet 411, and a first blower unit (or first blower) 413 installed at the top of the cabinet 411. The cabinet 411 may be formed in a hexahedral or substantially rectangular shape and may have an open front surface and a cavity. The cabinet 411 may include a second upper panel 411a which is provided on the top of the cabinet 411. The second upper panel 411a may form the top surface of the cabinet 411, and is formed in a substantially flat square shape. The top surface of the cabinet 411 may be formed to be flat with the second upper panel 411a. A user may position an ironing board 1 (see FIG. 4) on the flat top surface of the cabinet 411, and position laundry on the ironing board 1 to iron the laundry.

A first storage space 414 and a second storage space 415 may be provided at the open front surface of the cabinet 411. In example, the first storage space 414 may be provided above the second storage space 415, and the second storage space 415 may be provided below the first storage space 414. In another example (not shown in the drawings), the first storage space 414 may be provided below the second storage space 415.

The first storage space 414 may be opened and closed by sliding forward and rearward in the cabinet 411, and the second storage space 415 may also be opened and closed by sliding forward and rearward in the cabinet 411. When opened, the first storage space 414 may protrude forward from a front of the cabinet 411, and when closed, the first storage space 415 may be inserted into the internal cavity of the cabinet 411. When opened, the second storage space 415 may also protrude forward from the front of the cabinet 411, and when closed, the second storage space 415 may also be inserted into the internal cavity of the cabinet 411.

The first storage space 414 may store the ironing board 1. When a user wishes to iron laundry, the user may open the first storage space 414, remove the ironing board 1, and position the ironing board 1 on the top surface of the cabinet 411 to iron the laundry.

Figure 5:
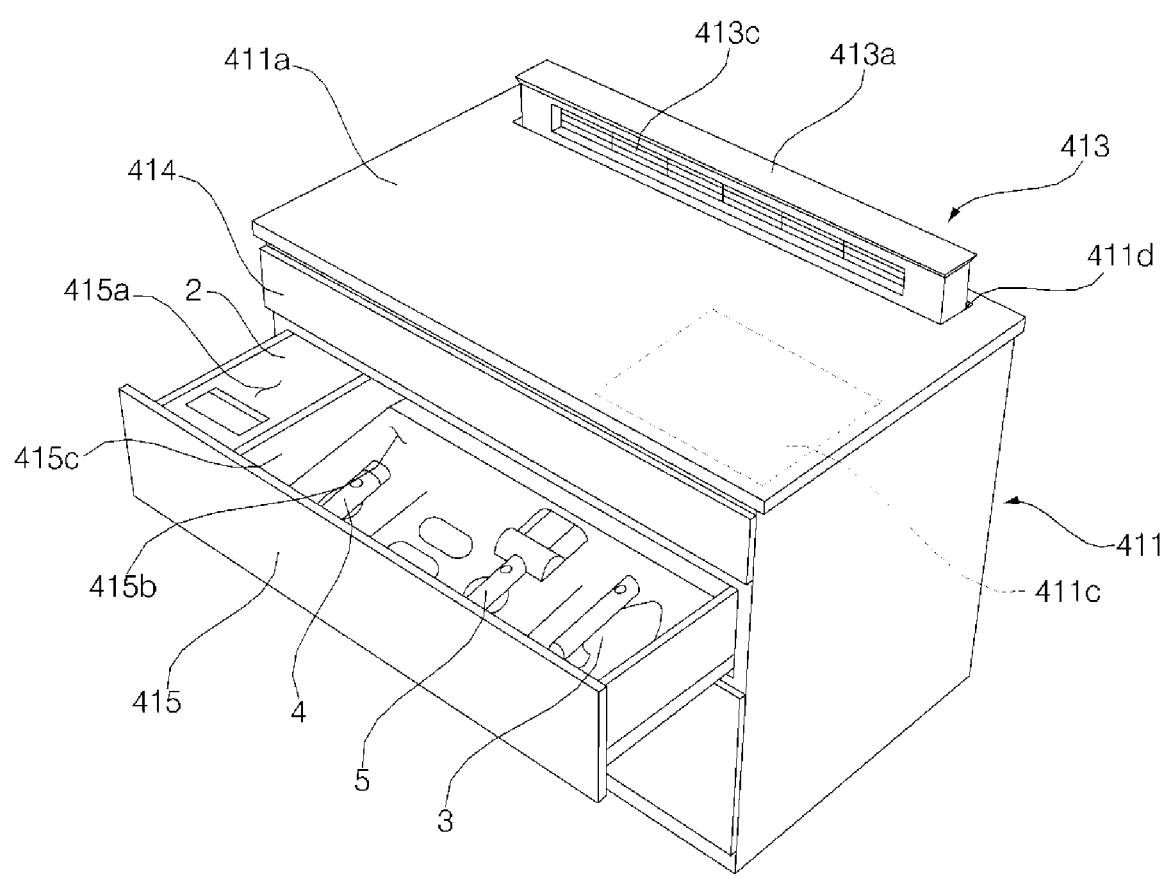
FIG. 5 is a view illustrating a second storage space which is opened in the dehumidifying and ironing module illustrated in FIG. 1.

The second storage space 415 may include a first storage part (or first storage region) 415a and a second storage part (or second storage region) 415b (see FIG. 5). The first storage part 415a and the second storage part 415b may be divided by a partition wall 415c installed at the second storage space 415. The first storage part 415a may include a condensate water container 2, and the second storage part 415b may include at least one of an iron 3, a steamer 4, or a remover (or fluff remover) 5. The condensate water container 2 may be a container or bin that receives and stores condensate water generated when the dehumidifying unit 412 dehumidifies indoor air. A user may then remove the condensate water container 2 from the first storage part 415a to dispose of the collected condensate water.

The iron 3 may be a device to iron laundry by converting electric power into heat. The iron 3 may have a stream spray function. A user may put the laundry on the ironing board 1, to iron the laundry by using the iron 3. The iron 3 may include, for example, a substantially planar surface, and a heating element that heats the planar surface.

The steamer 4 is a device that removes wrinkles and possibly disinfects the laundry by spraying high-temperature steam into the laundry. While hanging the laundry on the hanger 421 and positioning the hanger 421 on the hanging part 422, a user may position the steamer 4 close to or on the hung laundry to spray high-temperature steam on the hung laundry. The steamer 4 may include, for example, a water tank to store water and heating element to convert some of the stored water into steam.

The remover 5 is a device that cuts, tears off, suctions, or otherwise removes foreign materials such as fluff, lint, and pills from the laundry. For example, the remover may include While the laundry is hung on the hanger 421 and the hanger 421 is positioned on a hanging part 422, a user may rub the remover 5 on the laundry to remove fluff or other materials from the laundry. The remover 5 may include, for example, a screen that has openings to receive the fluff while block other portions of the laundry, and a blade that cuts the inserted fluff from the laundry.

A wireless charging unit (or wireless charging pad) 411c may be installed on the top of the cabinet 411. The wireless charging unit 411c may include a wireless charging coil (not shown). The wireless charging unit 411c may be provided horizontal to the cabinet 411 with a top surface of the wireless charging unit 411c being at similar height as a top surface of the cabinet 411. For example, the wireless charging unit 411c may be inserted into the second upper panel 411a.

The cloth management devices, such as the iron 3, the steamer 4, and the remover 5, may be placed on the top of the wireless charging unit 411c for wireless charging. The iron 3, the steamer 4, and the remover 5 each have a battery, and may further include a coil which electrically reacts with the wireless charging coil of the wireless charging unit 411c to charge the battery.

A suction grille 411b may be provided at the cabinet 411. The suction grille 411b may be shaped to form a plurality of air inlets. The suction grille 411b may correspond to an air inlet. In the embodiment, the air inlet associated with the suction grille 411b may be formed on the front surface of the cabinet 411, but the configuration of the dehumidifying and ironing module 410 is not limited thereto, and the air inlet may be formed on at least one of the front surface, the lateral surface, or the rear surface of the cabinet 411. Hereinafter, an example where the air inlet is formed on the front surface of the cabinet 411 is provided.

For example, the suction grille 411b is provided below the second storage space 415. The cabinet 411 may suction air thereinto through the suction grille 411b. The dehumidifying unit 412 is provided inside the cabinet 411 to dehumidify air suctioned into the cabinet 411 through the suction grille 411b. The dehumidifying unit 412 may have a cooling cycle circuit using a refrigerant. That is, the dehumidifying unit 412 may include a compressor 412a, a condenser (also referred to as a condensing coil) 412b, an expander (also referred to as an expansion valve) 412c, and an evaporator (also referred to as an evaporator coil) 412d (see FIG. 3). The compressor 412a may compress a refrigerant; the condenser 412b may condense the refrigerant compressed by the compressor 412a; the expander 412c may expand the refrigerant condensed by the condenser 412b; and the evaporator 412d may evaporate the refrigerant expanded by the expander 412c.

The evaporator 412d may cool and dehumidify the air suctioned into the cabinet 411 through the suction grille 411b by heat-exchanging. When the evaporator 412d cools the air inside the cabinet 411, water vapor contained in the air of the cabinet 411 is cooled and changed into condensate water, and the condensate water may be formed on the evaporator 412d. The condensate water container 2 may be provided below the evaporator 412d to receive and store the condensate water dropping from the evaporator 412d.

The compressor 412a and the condenser 412b may be connected to each other through a first refrigerant pipe 412e. The condenser 412b and the expander 412c may be connected to each other through a second refrigerant pipe 412f. The expander 412c and the evaporator 412d may be connected to each other through a third refrigerant pipe 412g. The evaporator 412d and the compressor 412a may be connected to each other through a fourth refrigerant pipe 412h. The refrigerant may circulate by sequentially passing the compressor 412a, the first refrigerant pipe 412e, the condenser 412b, the second refrigerant pipe 412f, the expander 412c, the third refrigerant pipe 412e, the evaporator 412d, and the fourth refrigerant pipe 412h.

In other examples, the dehumidifying unit 412 may dry the air without or in addition to the cooling cycle circuit. For example, the dehumidifying unit 412 may include a heater coil or infrared emitter that warms and dries air flowing through the dehumidifying unit 412. In another example, the dehumidifying unit 412 may include a desiccant or other hydroscopic material that traps moisture.

The first blower unit 413 may discharge the air, dehumidified in the cabinet 411 by the dehumidifying unit 412, to the outside of the cabinet 411. When operating, the first blower unit 413 may be drawn out of the cabinet 411, and when the operation stops, the first blower unit 413 may be re-inserted into the cabinet 411. In one example, when operating, the first blower unit 413 may be drawn out of the upper panel 411c of the cabinet 411 to protrude upward from the cabinet 411. When the operation stops, the first blower unit 413 is re-inserted into the upper panel 411c of the cabinet 411, such that the top surface of the first blower unit 413 is substantially horizontal at a height corresponding to the top surface of the cabinet 411.

An access hole 411d, through which the first blower unit 413 may pass, may be formed on the top of the cabinet 411. The access hole 411d may be formed close to a rear end of the second upper panel 411a, such that a sufficient remaining area may be provided on the second upper panel 411a to place the ironing board 1 in front of the access hole 411d.

The first blower unit 413 may include a case 413a, and a fan 413b which suctions the air to be dehumidified in the cabinet 411 by the dehumidifying unit 412 into the case 413a. A discharge grille 413c may be installed at the front surface of the case 413a. The discharge grille 413c may form a plurality of air outlets. The discharge grille 413c may be referred herein as an air outlet. In one implementation, the case 413 may have an open lower end, so that the dehumidified air, moved by the fan 413b, may be suctioned into the case 413a.

The fan 413b may be installed inside the cabinet 411, and may rotate based on receiving a driving force of a motor (not shown). The fan 413b may be provided above the evaporator 412d, and may be provided below the case 413a. The fan 413b may be vertically interposed between the case 413a and the evaporator 412d. The fan 413b may have a rotation axis which is vertically provided. When rotating, the fan 413b may suction the air, which is dehumidified in the cabinet 411 by the evaporator 412d, to send the suctioned dehumidified air into the case 413a; and the case 413a may discharge the dehumidified air sent by the fan 413b forward of the case 413a through the discharge grille 413c.

When the fan 413b operates, the case 413a may extend up to protrude upward from the cabinet 411 through the access hole 411d formed on the second upper panel 411a, so as to discharge the dehumidified air sent by the fan 413b to the outside of the case 413a through the discharge grille 413c. Further, when the fan 413b stops operating, the case 413a may be re-inserted into the cabinet 411 through the access hole 411d. When the case where the case 413a is completely re-inserted into the cabinet 411 through the access hole 411d, the top surface of the case 413a may be positioned at a horizontal position that substantially corresponds to the top surface of the second upper panel 411a.

In one implementation, the case 413a may be installed to be movable upward and downward of the second upper panel 411a. In one implementation, when the fan 413b operates, the case 413a may extend up to protrude upward from the cabinet 411, and when the fan 413b stops operating, the case 413a may be re-inserted into the case 411. For example, the vertical movement of the case 413a may controlled (e.g., by controller 413) based on the operation of the fan 413b, such as controlling a motor (not shown) to selectively lift the case 413a based on the operation of the fan 413b.

As previously described, the drying module 420 may include a second blower unit 424 and a hanging part 422 installed at the second blower unit 424. The second blower unit 424 suctions indoor air and outputs a flow of the air toward laundry hung on the hanger 421 that is positioned on hanging part 422. The laundry may be dried by the air sent by the second blower unit 424. Since air surrounding the laundry may include the dehumidified air discharged by the first blower unit 413, the surrounding air may be relatively dry, and a drying time of the laundry from the air discharged by the second blower unit 424 may be reduced.

The second blower unit 424 may include: a housing 423 having an air inlet (not shown) and an air outlet (not shown); and a fan (not shown) which is provided inside the housing to suction air, suctioned into the housing through the air inlet, and to send the air through the air outlet of the second blower unit 424. A discharge grille is may be provided at a rear lower portion of the second blower unit 424. The discharge grille may form a plurality of the air inlets. The discharge grille may be tilted with a front end being provided higher than a rear end, so as to discharge air forward and downward.

The first blower unit 413 is provided below and rearward of the hanging part 422, such that the first blower unit 413 may discharge the dehumidified air forward and toward a region near laundry positioned on the drying module 420. Further, the second blower unit 424 may discharge air forward and downward from the rear side of the hanging part 422.

The first blower unit 413 may discharge the dehumidified air downward of the laundry, and the second blower unit 424 may discharge air toward a region where the dehumidified air, discharged by the first blower unit 413, is present. Accordingly, the air, which is sent by the second blower unit 424 toward the laundry hung on the hanger 421, is mixed with vapor generated in the course of drying the laundry, and then meets the dehumidified air discharged by the first blower unit 413, thereby reducing a drying time of the laundry.

Figure 6:
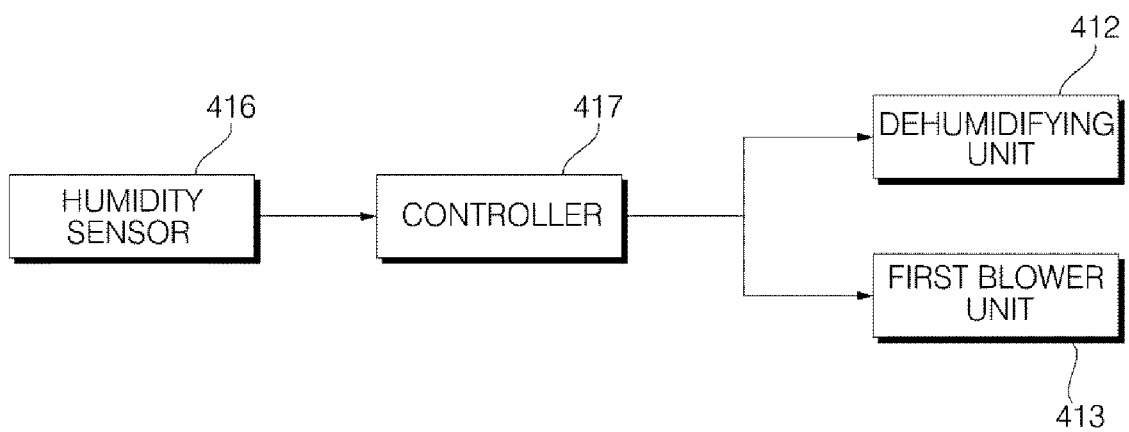
FIG. 6 is a control block diagram illustrating a laundry treatment apparatus according to an embodiment of the present disclosure.

As shown in FIG. 6, the ironing part 400 may further include a humidity sensor 416 and a controller 417. The humidity sensor 416 may sense humidity values of surrounding air (e.g., air in the region between the dehumidifying and ironing module 410 and the drying module 420). The humidity values sensed by the humidity sensor 416 may be input to the controller 417. Upon receiving the humidity values sensed by the humidity sensor 416, the controller 417 may compare the humidity values with a predetermined value.

When the humidity value input by the humidity sensor 416 is equal to or greater than the predetermined value, the controller 417 may operate the dehumidifying unit 412 and the first blower unit 413. Further, in the case where the humidity value input by the humidity sensor 416 is lower than the predetermined value, the controller 417 may stop the dehumidifying unit 412 and the first blower unit 413. Accordingly, when the dryer 400 dries the laundry, the dehumidifying unit 412 and the first blower unit 413 repeatedly operate and stop automatically according to the surrounding humidity of the laundry, thereby reducing power consumption associated with the operation of the dehumidifying unit 412 and the first blower unit 413.

The humidity sensor 416 may be installed close to the laundry hung on the hanger 421, which is positioned the hanging part 422, so that the dehumidifying unit 412 and the first blower unit 413 may operate automatically only when the humidity of the surrounding air of the hung laundry is equal to or greater than the predetermined value. For example, the humidity sensor 416 may be installed at or adjacent to the second upper panel 411a on the top of the cabinet 411.

An aspect of the present disclosure provides a laundry treatment apparatus which may dry laundry by sending air to the laundry while the laundry is hung on a hanger, and may dehumidify surrounding air of the laundry when drying the laundry, thereby reducing a drying time of the laundry. Another aspect of the present disclosure provides a laundry treatment apparatus which may reduce a drying time of the laundry by optimizing a flow of air sent to the laundry and a flow of the dehumidified air discharged around the laundry.

Another aspect of the present disclosure provides a laundry treatment apparatus, in which an ironing board may be put on a flat surface for ironing of the laundry. Another aspect of the present disclosure provides a laundry treatment apparatus, in which while an ironing device to iron the laundry is placed near a position where the ironing board is put, the ironing device may be charged via wireless charging.

Another aspect of the present disclosure provides a laundry treatment apparatus, in which the ironing board may be stored. Yet another aspect of the present disclosure provides a laundry treatment apparatus, in which condensate water, generated when the surrounding air of the laundry is dehumidified, may be easily removed from a condensate water container that stores the condensate water.

Another aspect of the present disclosure provides a laundry treatment apparatus, in which the ironing device may be stored. A further aspect of the present disclosure provides a laundry treatment apparatus, which may reduce power consumption when the laundry is dried.

These and other aspects of the present disclosure, there is provided a laundry treatment apparatus including: a cabinet having an air inlet; a dehumidifying unit which is provided inside the cabinet, and dehumidifies air suctioned into the cabinet through the air inlet; a first blower unit which is provided at a top portion of the cabinet, and discharges the air dehumidified in the cabinet by the dehumidifying unit; and a second blower unit which is provided over the cabinet with a distance therebetween, has a hanging part on which a hanger is hung, and suctions air to send the air to the laundry hung on the hanger.

The laundry treatment apparatus may include: the first blower unit which is provided below and rearward of the hanging part, and discharges the dehumidified air forward; and the second blower unit which discharges air forward and downward from a rear side of the hanging part.

The cabinet may have a flat top surface. The laundry treatment apparatus may further include a wireless charging unit which is installed at the top portion of the cabinet, and a top surface of which is at the same height as the top surface of the cabinet, such that the two top surfaces are provided horizontal to each other. The laundry treatment apparatus may further include a first storage space, which is opened and closed by sliding forward and rearward in the cabinet, and which stores an ironing board. The laundry treatment apparatus may further include a second storage space which is opened and closed by sliding forward and rearward in the cabinet, in which the second storage space has a first storage part including a condensate water container that stores condensate water generated by the dehumidifying unit. The second storage space may further include a second storage part which stores at least one of an iron, a steamer, and a remover.

The laundry treatment apparatus may further include: a humidity sensor which senses a humidity value; and a controller, which in response to the humidity value sensed by the humidity sensor being equal to or greater than a predetermined value, operates the dehumidifying unit and the first blower unit, and in response to the humidity value sensed by the humidity sensor being lower than the predetermined value, stops the dehumidifying unit and the first blower unit.

The surrounding air of laundry remains to be dry by the dehumidified air discharged by the first blower unit, and the laundry is dried by air discharged by the second blower unit, thereby reducing a drying time of the laundry. The first blower unit discharges the dehumidified air downward of the laundry, and the second blower unit discharges the air toward a portion where the dehumidified air, discharged by the first blower unit, is present, thereby reducing a drying time of the laundry. An ironing board may be put on the flat top surface of the cabinet for ironing of the laundry. An ironing device may be placed on a wireless charging unit for wireless charging.

The ironing board may be stored in the first storage space, and may be taken out from the first storage space to be immediately available for use in ironing of laundry. A condensate water container may be taken out from the second storage space, and condensate water stored in the condensate water container may be easily removed from the condensate water container. At least one of an iron, a steamer, and a remover may be taken out from the second storage space to be immediately available for use in ironing of laundry. The dehumidifying unit and the first blower unit repeatedly operate and stop according to a surrounding humidity of the laundry when the laundry is dried, thereby reducing power consumption.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment apparatus comprising:
    a cabinet having an air inlet;
    a dehumidifier which is provided inside the cabinet, and dehumidifies air suctioned into the cabinet through the air inlet;
    a first blower which is provided at a top of the cabinet, and discharges the air dehumidified in the cabinet by the dehumidifier; and
    a second blower which is provided over the cabinet with a distance therebetween, and suctions air to send the suctioned air toward laundry hung above the cabinet.

2. The laundry treatment apparatus of claim 1, wherein when operating, the first blower is drawn out of the cabinet, and when stopping operation, is inserted into the cabinet.

3. The laundry treatment apparatus of claim 2, wherein an access hole, through which the first blower passes, is provided at the top of the cabinet.

4. The laundry treatment apparatus of claim 1, wherein the first blower includes:
    a case having an air outlet; and
    a fan which suctions the air dehumidified in the cabinet by the dehumidifier, and sends the air into the case.

5. The laundry treatment apparatus of claim 1, wherein:
    the first blower is provided below and rearward of the laundry, and discharges the dehumidified air forward; and
    the second blower discharges air forward and downward from a rear side of the laundry.

6. The laundry treatment apparatus of claim 1, wherein the dehumidifier includes:
    a compressor to compress a refrigerant;
    a condenser configured to condense the refrigerant having passed through the compressor;
    an expander configured to expand the refrigerant having passed through the condenser;
    an evaporator configured to evaporate the refrigerant having passed through the expander and moving to the compressor, and to dehumidify air by cooling the air suctioned into the cabinet.

7. The laundry treatment apparatus of claim 1, wherein the air inlet is provided at a front surface of the cabinet.

8. The laundry treatment apparatus of claim 1, wherein a top surface of the cabinet is formed to be flat.

9. The laundry treatment apparatus of claim 8, further comprising a wireless charger which is installed at the top surface of the cabinet, and a top surface of which is at the same height as the top surface of the cabinet, such that the top surfaces of the cabinet and the wireless charger are provided horizontal to each other.

10. The laundry treatment apparatus of claim 1, further comprising a first storage space which is opened and closed by sliding forward and rearward in the cabinet, and which stores an ironing board.

11. The laundry treatment apparatus of claim 10, further comprising a second storage space which is opened and closed by sliding forward and rearward in the cabinet,
    wherein the second storage space has a first storage region including a condensate water container which stores condensate water generated by the dehumidifier.

12. The laundry treatment apparatus of claim 11, wherein the second storage space further comprises a second storage region which stores at least one of an iron, a streamer, and a fluff remover.

13. The laundry treatment apparatus of claim 11, further comprising:
    a humidity sensor which senses a humidity value of surrounding air of the laundry; and
    a controller, which in response to the humidity value sensed by the humidity sensor being equal to or greater than a predetermined value, operates the dehumidifier and the first blower, and in response to the humidity value sensed by the humidity sensor being lower than the predetermined value, stops the dehumidifier and the first blower.

* * * * *